US012705543B2

(12) United States Patent
Vemulapalli et al.

(10) Patent No.: US 12,705,543 B2
(45) **Date of Patent: *Aug. 11, 2026**

(54) LEARNING MACHINE TRAINING BASED ON PLAN TYPES

(71) Applicant: Hipmunk, Inc., San Francisco, CA (US)

(72) Inventors: Bharat Sri Vardhan Vemulapalli, San Francisco, CA (US); Eric Etu, Walnut Creek, CA (US); Marguerite Ellis, San Francisco, CA (US)

(73) Assignee: Hipmunk, Inc., San Francisco, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 18/514,968

(22) Filed: Nov. 20, 2023

(65) Prior Publication Data

US 2024/0086777 A1 Mar. 14, 2024

Related U.S. Application Data

(63) Continuation of application No. 16/512,057, filed on Jul. 15, 2019, now Pat. No. 11,861,460.

(51) Int. Cl.
*G06N 20/00* (2019.01)
*G06F 16/2457* (2019.01)

(52) U.S. Cl.
CPC ....... *G06N 20/00* (2019.01); *G06F 16/24573* (2019.01)

(58) Field of Classification Search
CPC .......................... G06N 20/00; G06F 16/24573
USPC ........................................................... 706/12
See application file for complete search history.

(56) References Cited

U.S. PATENT DOCUMENTS

| | | | |
|---|---|---|---|
| 6,711,548 B1 | 3/2004 | Rosenblatt | |
| 2006/0265256 A1 | 11/2006 | Galperin et al. | |
| 2007/0208503 A1 * | 9/2007 | Harnsberger .......... | G09B 29/10 701/532 |

(Continued)

OTHER PUBLICATIONS

"U.S. Appl. No. 16/512,057, Advisory Action mailed Mar. 15, 2023", 4 pgs.

(Continued)

*Primary Examiner* — Stephen S Hong
*Assistant Examiner* — Broderick C Anderson
(74) *Attorney, Agent, or Firm* — SCHWEGMAN LUNDBERG & WOESSNER, P.A.

(57) ABSTRACT

A system for training a learning machine accesses a training database of reference metadata that describes reference plans that include reference first-type plans and reference second-type plans. Such plans may be travel plans or other plans. The system trains the learning machine to distinguish candidate first-type plans from candidate second-type plans. The training of the learning machine is based on a set of decision trees generated from randomly selected subsets of the reference metadata, and the randomly selected subsets each describe a corresponding randomly selected portion of the reference plans. The system then modifies the trained learning machine based on asymmetrical penalties for incorrectly distinguishing candidate first-type plans from candidate second-type plans. The system then provides the modified learning machine for run-time use in classifying plans.

18 Claims, 5 Drawing Sheets

(56) References Cited

U.S. PATENT DOCUMENTS

| | | | | |
|---|---|---|---|---|
| 2009/0210262 | A1* | 8/2009 | Rines | G06Q 10/06 705/5 |
| 2010/0228577 | A1* | 9/2010 | Cunningham | G06Q 10/02 715/764 |
| 2011/0137691 | A1 | 6/2011 | Johnson | |
| 2012/0278263 | A1* | 11/2012 | Borthwick | G06N 20/00 706/12 |
| 2015/0012467 | A1 | 1/2015 | Greystoke et al. | |
| 2015/0012472 | A1 | 1/2015 | Liang et al. | |
| 2018/0276573 | A1* | 9/2018 | Otillar | G06Q 10/02 |
| 2019/0250839 | A1 | 8/2019 | Bedadala et al. | |
| 2019/0376793 | A1 | 12/2019 | Krome et al. | |
| 2021/0019649 | A1 | 1/2021 | Vemulapalli et al. | |

OTHER PUBLICATIONS

"U.S. Appl. No. 16/512,057, Examiner Interview Summary mailed Feb. 23, 2023", 2 pgs.
"U.S. Appl. No. 16/512,057, Examiner Interview Summary mailed Jul. 25, 2022", 2 pgs.
"U.S. Appl. No. 16/512,057, Final Office Action mailed Dec. 22, 2022", 18 pgs.
"U.S. Appl. No. 16/512,057, Non Final Office Action mailed May 4, 2023", 18 pgs.
"U.S. Appl. No. 16/512,057, Non Final Office Action mailed May 12, 2022", 17 pgs.
"U.S. Appl. No. 16/512,057, Notice of Allowance mailed Aug. 22, 2023", 8 pgs.
"U.S. Appl. No. 16/512,057, Response filed Feb. 16, 2023 to Final Office Action mailed Dec. 22, 2022", 16 pgs.
"U.S. Appl. No. 16/512,057, Response filed Aug. 3, 2022 to Non Final Office Action mailed May 12, 2022", 14 pgs.
"U.S. Appl. No. 16/512,057, Response filed Aug. 4, 2023 to Non Final Office Action mailed May 4, 2023", 14 pgs.
Katahira, Kentaro, "The Statistical Structures of Reinforcement Learning With Asymmetric Value Updates", Journal of Mathematical Psychology, vol. 87, Elsevier BV, (Dec. 2018), 31-45.
Wu, S H, et al., "On Generalizable Low False-Positive Learning Using Asymmetric Support Vector Machines", in IEEE Transactions on Knowledge and Data Engineering, vol. 25, No. 5, (May 2013), 1083-1096.

* cited by examiner

LEARNING MACHINE TRAINING BASED ON PLAN TYPES

CROSS-REFERENCE TO RELATED APPLICATIONS

This application is a continuation of prior application Ser. No. 16/512,057, filed on Jul. 15, 2019, which is incorporated by reference herein in its entirety.

TECHNICAL FIELD

The subject matter disclosed herein generally relates to the technical field of special-purpose machines that facilitate artificial intelligence, including software-configured computerized variants of such special-purpose machines and improvements to such variants, and to the technologies by which such special-purpose machines become improved compared to other special-purpose machines that facilitate artificial intelligence. Specifically, the present disclosure addresses systems and methods to facilitate training a learning machine.

BACKGROUND

A machine in the form of a computer system may be configured (e.g., via suitable software programming) to function as a learning machine. For example, the learning machine may be caused to undergo or otherwise implement a supervised learning algorithm by which the learning machine accesses training data that specifies certain inputs that correspond to certain (e.g., desired) outputs. The learning machine iteratively modifies a function (e.g., an objective function) to optimize the function's ability to reproduce the training data's outputs from their corresponding inputs. Another machine (e.g., another computer system) may be configured to train the learning machine, for example, by programming, commanding, or otherwise causing the learning machine to execute the supervised learning algorithm, including its constituent operations, resulting in the learning machine becoming trained based on the training data.

BRIEF DESCRIPTION OF THE DRAWINGS

Some embodiments are illustrated by way of example and not limitation in the figures of the accompanying drawings.

SUMMARY

Figure 1:
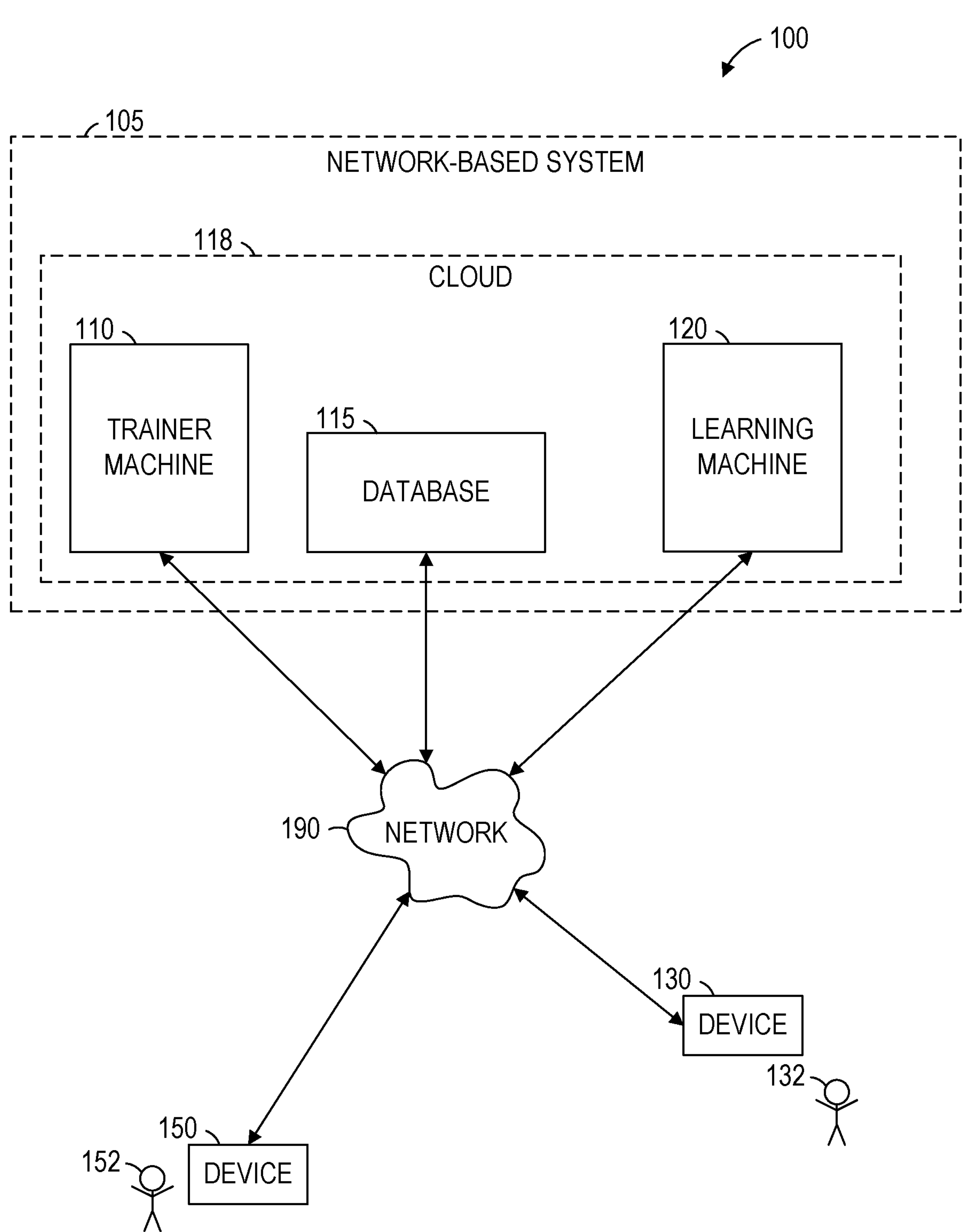
FIG. 1 is a network diagram illustrating a network environment suitable for training a learning machine, according to some example embodiments.

In accordance with the systems, methods, and machine-readable media described herein, a system (e.g., including a trainer machine or other computer system for training a learning machine) accesses a training database of reference metadata descriptive of reference travel plans that include reference first-type plans and reference second-type plans. The system then trains a learning machine to distinguish candidate first-type plans from candidate second-type plans. The training of the learning machine is based on a set of decision trees generated from randomly selected subsets of the reference metadata, and the randomly selected subsets each describe a corresponding randomly selected portion of the reference plans. The decision trees may include random decision trees, such as those generated by a Random Forests® technique. The system then modifies the trained learning machine, and this modification of the learning machine is based on asymmetrical penalties for incorrectly distinguishing candidate first-type plans from candidate second-type plans. The system then provides the modified learning machine for run-time use (e.g., in classifying plans of the first type from plans of the second type). At this point, the modified, trained learning machine has been trained to distinguish candidate first-type plans from candidate second-type plans based on the asymmetrical penalties for incorrectly distinguishing candidate first-type plans from candidate second-type plans. According to various example embodiments, such reference or candidate plans may include reference or candidate travel plans (e.g., travel itineraries, each including one or more flights reserved or taken, one or more hotel stays reserved or completed, one or more car rentals reserved or completed, etc., or any suitable combinations thereof).

DETAILED DESCRIPTION

Example methods (e.g., algorithms) facilitate training a learning machine based on plan types, and example systems (e.g., special-purpose machines configured by special-purpose software) are configured to facilitate training a learning machine based on plan types. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

For brevity and clarity, several example embodiments of the systems and methods described herein discuss example scenarios in which the plans are travel plans (e.g., travel itineraries). However, other types of plans are contemplated by the present subject matter (e.g., delivery routes, equipment maintenance plans, event schedules, or task performance sequences).

FIG. 1 is a network diagram illustrating a network environment 100 suitable for training a learning machine 120, according to some example embodiments. The network environment 100 includes a trainer machine 110, a database 115, the learning machine 120, and devices 130 and 150, all communicatively coupled to each other via a network 190. The trainer machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The trainer machine 110, the database 115, the learning machine 120, and the devices 130 and 150 may each be implemented in a special-purpose (e.g., specialized) computer system, in whole or in part, as described below with respect to FIG. 5.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 5, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 is a network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
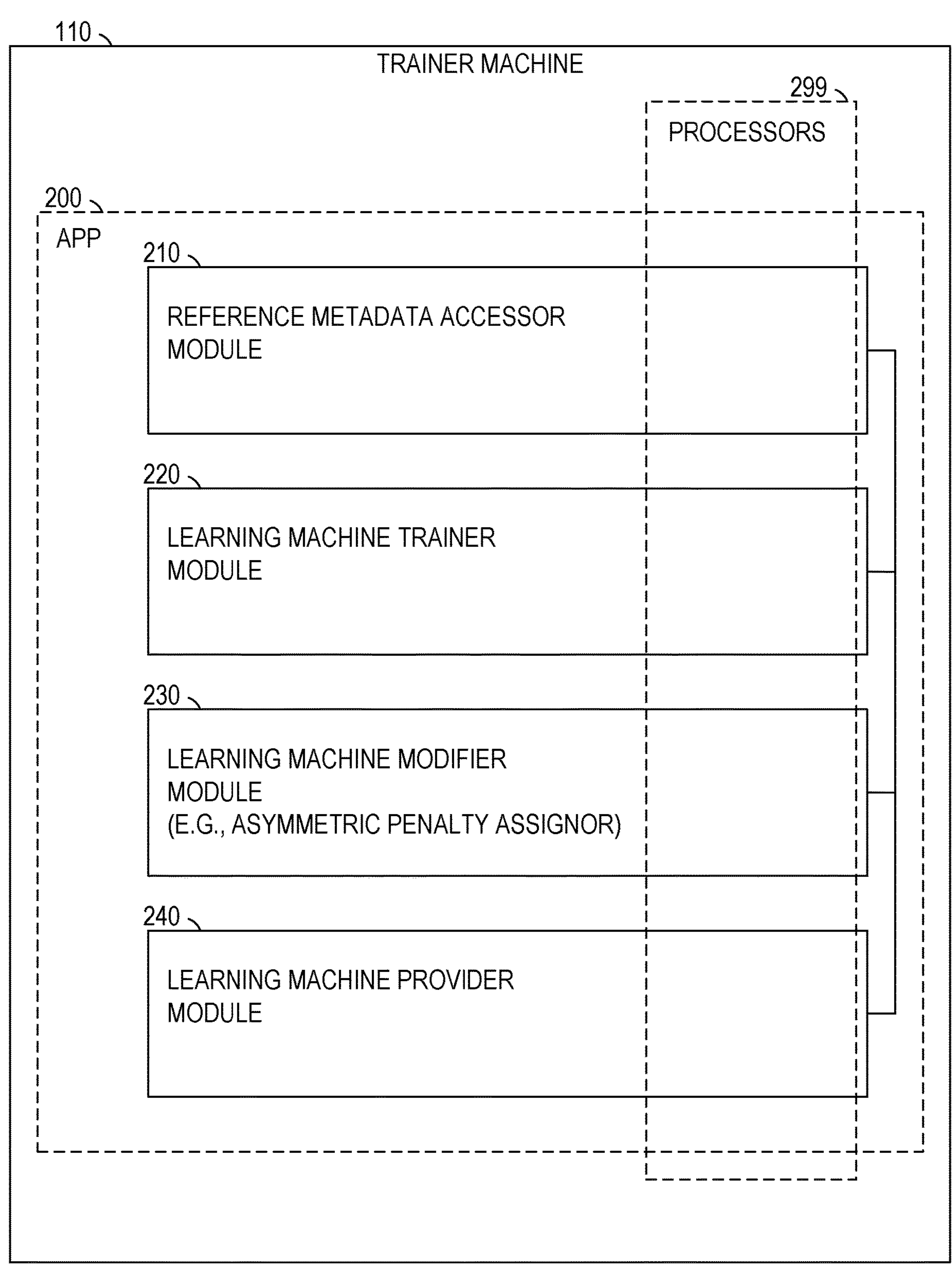
FIG. 2 is a block diagram illustrating components of a trainer machine suitable for training the learning machine, according to some example embodiments.

FIG. 2 is a block diagram illustrating components of the trainer machine 110, as configured for training the learning machine 120, according to some example embodiments. The trainer machine 110 is shown as including a reference metadata accessor module 210, a learning machine trainer module 220, a learning machine modifier module 230, and a learning machine provider module 240, all configured to communicate with each other (e.g., via a bus, shared memory, or a switch). The reference metadata accessor module 210 may be or include custom software, custom hardware, or both, configured to access reference metadata of reference plans (e.g., stored by the database 115 and accessed therefrom). The learning machine trainer module 220 may be or include custom software, custom hardware, or both, configured to train the learning machine 120 (e.g., initially train the learning machine 120 based on training data). The learning machine modifier module 230 may be or include custom software, custom hardware, or both, configured to modify the trained learning machine 120 (e.g., as trained by the learning machine trainer module 220). The learning machine provider module 240 may be or include custom software, custom hardware, or both, configured to provide (e.g., for run-time usage) the modified, trained learning machine 120 (e.g., as modified by the learning machine modifier module 230).

As shown in FIG. 2, the reference metadata accessor module 210, the learning machine trainer module 220, the learning machine modifier module 230, the learning machine provider module 240, or any suitable combination thereof, may form all or part of an app 200 (e.g., a mobile app) that is stored (e.g., installed) on the trainer machine 110 (e.g., responsive to or otherwise as a result of data being received via the network 190). Furthermore, one or more processors 299 (e.g., hardware processors, digital processors, or any suitable combination thereof) may be included (e.g., temporarily or permanently) in the app 200, the reference metadata accessor module 210, the learning machine trainer module 220, the learning machine modifier module 230, the learning machine provider module 240, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 3:
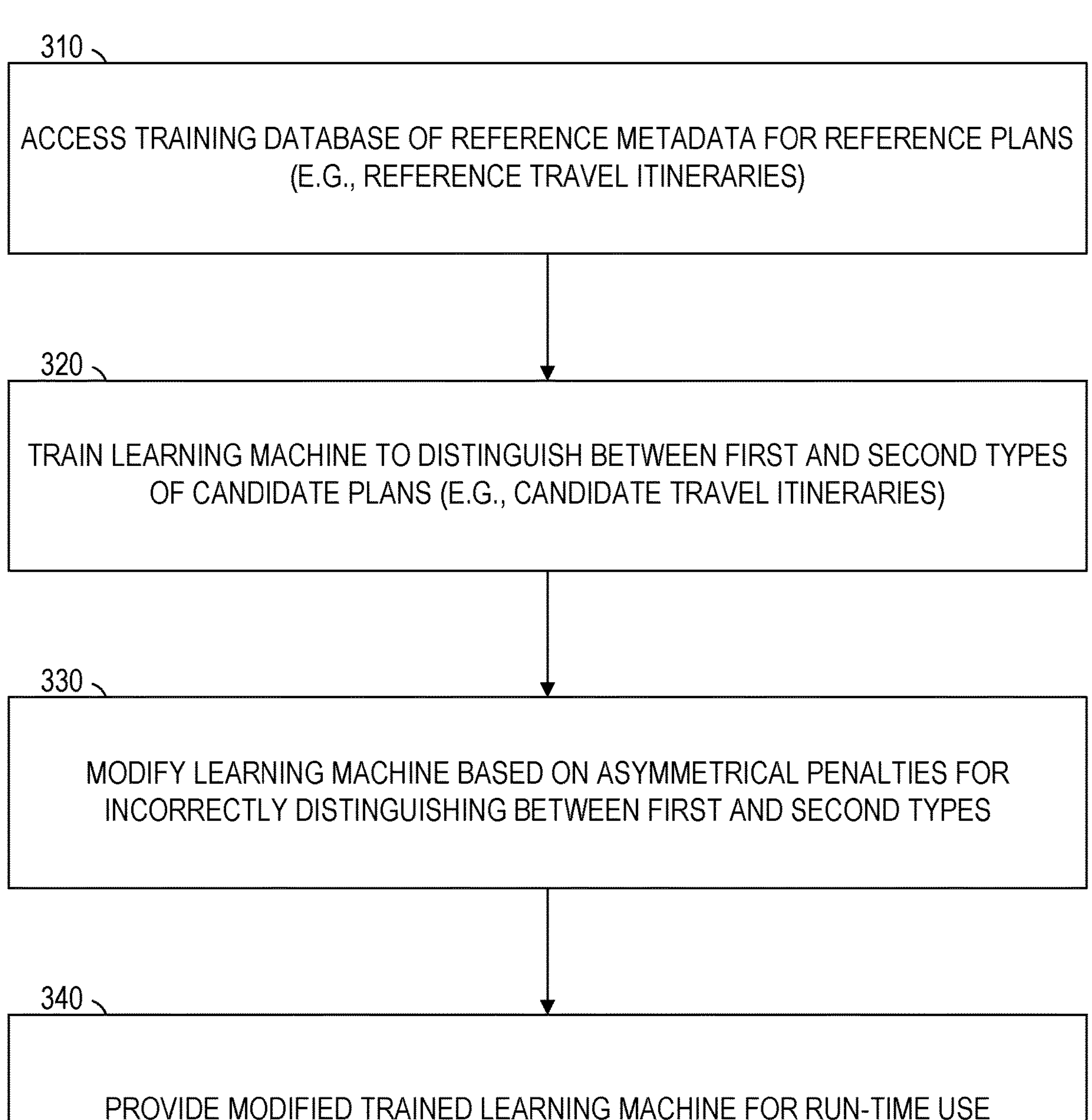
FIGS. 3 and 4 are flowcharts illustrating operations of the trainer machine in performing a method of training, modifying, and providing the learning machine, according to some example embodiments.
Figure 4:
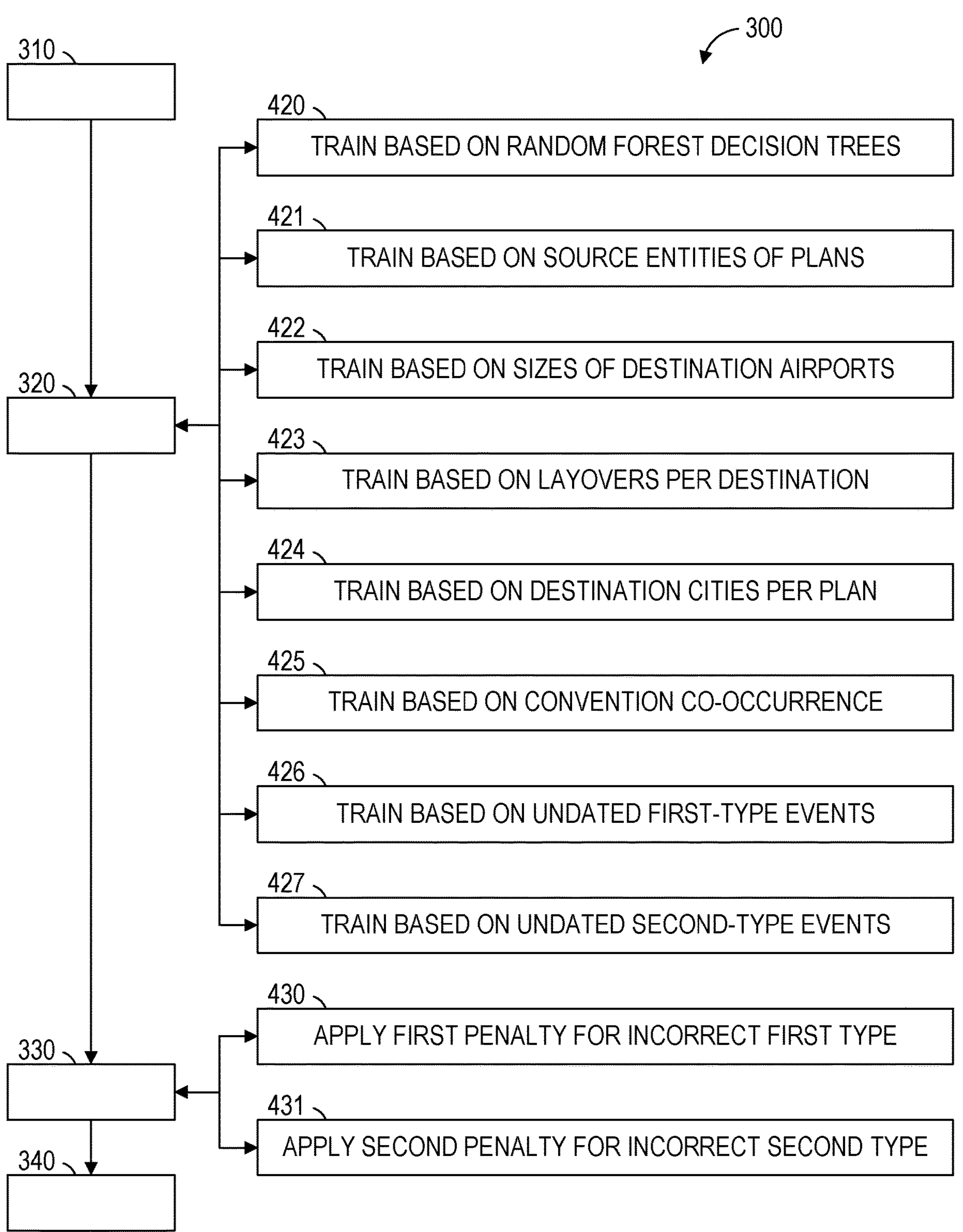

FIGS. 3 and 4 are flowcharts illustrating operations of the trainer machine 110 in performing a method 300 of training, modifying, and providing the learning machine 120 for run-time use, according to some example embodiments. Operations in the method 300 may be performed by the trainer machine 110, using components (e.g., modules) described above with respect to FIG. 2, using one or more processors (e.g., microprocessors or other hardware processors), or using any suitable combination thereof. As shown in FIG. 3, the method 300 includes operations 310, 320, 330, and 340.

In operation 310, the reference metadata accessor module 210 accesses a training database (e.g., stored in the database 115) of reference metadata. The accessed reference metadata corresponds to reference plans (e.g., a set of reference travel plans or other reference plans), describes aspects of the reference plans, and is associated (e.g., by the training database) with these reference plans. Each one of the reference plans has its respectively corresponding associated reference metadata that describes that reference plan. For example, the reference plans may be reference travel plans that include reference first-type travel plans and reference second-type travel plans. In various example embodiments, the first-type travel plans are travel plans classified as personal travel plans (e.g., for recreation or for family visits), non-tracked travel plans (e.g., for tax calculations or for other accounting calculations), non-reimbursable travel plans, non-business travel plans, or any suitable combination thereof; and the second-type travel plans are travel plans classified as non-personal travel plans (e.g., for work or for non-recreational travel), tracked travel plans (e.g., for tax calculations or for other accounting calculations), reimbursable travel plans, business travel plans, or any suitable combination thereof.

In operation 320, the learning machine trainer module 220 trains the learning machine 120 (e.g., from an untrained state to a trained state, or from a pre-training state to a post-training state) to function as an artificially intelligent classifier configured to distinguish between first and second types of plans. Accordingly, by virtue of the learning machine trainer module 220 performing operation 320, the learning machine 120 becomes trained to distinguish between first and second types of candidate plans (e.g., candidate travel itineraries to be classified as first-type travel itineraries or second-type travel itineraries). That is, the trained learning machine 120 is configured by this training process to determine whether a given candidate plan is classified (e.g., categorized or labelled) as a first-type candidate plan or as a second-type candidate plan.

According to various example embodiments, the training of the learning machine 120 in operation 320 may be based on one or more factors. Examples of such factors include: whether a plan is a one-way plan or a round-trip plan (e.g., whether a flight in the plan was round-trip); whether a plan included international travel (e.g., whether the plan included an international flight); the number of travelers corresponding to a plan (e.g., travelling together in the same travel itinerary); the day of the week on which a plan begins (e.g., Sunday, Monday, etc.); the day of the week on which a plan ends; the local time at which a plan begins; the local time at which a plan ends; the number of destinations in a plan (e.g., the total count of destination cities or airports); the number of stops (e.g., layovers or stopovers) per destination in a plan (e.g., the ratio of stops to destination cities or airports); the sizes of the destination cities or airports in a plan (e.g., above or below a predetermined threshold size); whether the date or date range of a plan includes a holiday (e.g., includes a governmental holiday, such as a federal holiday); whether a plan includes a car rental reservation; whether a plan includes a hotel reservation; the source entity (e.g., a travel website among multiple travel websites) through which a plan was reserved; and any suitable combination thereof.

Accordingly, a one-way plan may be more likely to be a first-type (e.g., personal or recreational) plan, while a round-trip plan may be less likely to be a first-type plan, more likely to be a second-type (e.g., non-personal or non-recreational) plan, or both. A plan that does not include international travel may be more likely to be a first-type plan, while a plan that includes international travel may be less likely to be a first-type plan, more likely to be a second-type plan, or both. A plan with a traveler count above a threshold value may be more likely to be a first-type plan, while a plan with a traveler count at or below the threshold value may be less likely to be a first-type plan, more likely to be a second-type plan, or both. A plan that begins or ends on a certain day of the week may be more likely to be a first-type plan, while plans that do not may be less likely to be a first-type plan, more likely to be a second-type plan, or both. A plan that begins or ends during certain hours of the day in local time may be more likely to be a first-type plan, while plans that do not may be less likely to be a first-type plan, more likely to be a second-type plan, or both. A plan with a low number of destinations at or below a threshold value may be more likely to be a first-type plan, while plans with high numbers of destinations above the threshold value may be less likely to be a first-type plan, more likely to be a second-type plan, or both. A plan with a low number of stops (e.g., at or below a threshold value of zero or one) may be more likely to be a first-type plan, while plans with high numbers of stops (e.g., above the threshold value) may be less likely to be a first-type plan, more likely to be a second-type plan, or both. A plan with a low ratio of stops to destinations (e.g., at or below a threshold value) may be more likely to be a first-type plan, while plans with high ratios of stops to destinations (e.g., above the threshold value) may be less likely to be a first-type plan, more likely to be a second-type plan, or both.

Furthermore, a plan with destination cities or airports at or below a threshold size may be more likely to be a first-type plan, while plans with destination cities or airports above the threshold size may be less likely to be a first-type plan, more likely to be a second-type plan, or both. A plan whose date or date range includes a holiday (e.g., a governmental holiday) may be more likely to be a first-type plan, while plans whose dates or date ranges do not may be less likely to be a first-type plan, more likely to be a second-type plan, or both. A plan that includes a car rental reservation may be more likely to be a first-type plan, while plans that do not may be less likely to be a first-type plan, more likely to be a second-type plan, or both. A plan that does not include a hotel reservation may be more likely to be a first-type plan, while plans that do may be less likely to be a first-type plan, more likely to be a second-type plan, or both. A plan reserved through a first source entity (e.g., a first travel website) may be more likely to be a first-type plan, while plans reserved through a second source entity (e.g., a second travel website) may be less likely to be a first-type plan, more likely to be a second-type plan, or both.

In operation 330, the learning machine modifier module 230 modifies the learning machine 120 (e.g., as previously trained in operation 320). The modification of the learning machine 120 in operation 330 is based on a pair of asymmetrical penalties (e.g., asymmetrical adverse or negative weights) for incorrectly (e.g., erroneously, inaccurately, or wrongly) distinguishing between first and second types of plans. In some example embodiments, the penalty (e.g., a first penalty) for incorrectly classifying a plan as a first-type plan is greater than the penalty (e.g., a second penalty) for incorrectly classifying a plan as a second-type plan. In other example embodiments, the penalty for incorrectly classifying a plan as a first-type plan is lesser than the penalty for incorrectly classifying a plan as a second-type plan. The asymmetrical penalties may be applicable to reference plans (e.g., whose types are known during training of the learning machine 120), candidate plans (e.g., whose types are to be determined at run-time), or both, according to various example embodiments.

In operation 340, the learning machine provider module 240 provides the output of operation 330, namely, the trained and modified learning machine 120 for run-time use. This may be performed by enabling one or more of the devices 130 and 150 to access the learning machine 120 (e.g., via a user interface, such as a graphical user interface, or via a programmatic interface, such as an application programming interface); marking the learning machine 120 as being ready, released, or otherwise available for run-time use (e.g., as part of the network-based system 105) in distinguishing between first and second types of plans; uploading or otherwise implementing a copy of the learning machine 120 into the cloud 118 or other portion of the network-based system 105; providing a copy of the learning machine 120 to one or more of the devices 130 and 150; or any suitable combination thereof.

As shown in FIG. 4, in addition to any one or more of the operations previously described, the method 300 may include one or more of operations 420, 421, 422, 423, 424, 425, 426, 427, 430, and 431. One or more of operations 420-427 may be performed as part (e.g., a precursor task, a subroutine, or a portion) of operation 320, in which the learning machine trainer module 220 trains the learning machine 120 to distinguish between first and second types of plans (e.g., reference plans, candidate plans, or both).

In operation 420, the training of the learning machine 120 is based on decision trees constructed or otherwise generated by a Random Forests® technique. For example, such decision trees may be generated from randomly selected subsets of the reference metadata accessed in operation 310. Such generated decision trees may be stored (e.g., temporarily or permanently) in the database 115, in the trainer machine 110, or in both. The randomly selected subsets of the reference metadata may each describe a corresponding randomly selected portion of the reference plans (e.g., a randomly chosen subdivision of the reference travel itineraries to which the reference metadata corresponds). Accordingly, performance of operation of 420 may include randomly selecting portions of the reference plans that correspond to the reference metadata, randomly selecting subsets of the reference metadata, generating decision trees from the randomly selected subsets of the reference metadata or the corresponding reference metadata for the randomly selected portions of the reference plans, training the learning machine 120 based on the generated decision trees, or any suitable combination thereof.

Operation 421 may be suitable where the reference plans are reference travel plans, and the reference metadata of the reference travel plans indicates source entities that each reserved a corresponding reference travel plan among the reference travel plans for a corresponding user. In operation 421, the training of the learning machine 120 to distinguish candidate first-type travel plans from candidate second-type travel plans is based on the indicated source entities. Thus, where the source entities are or include sources of travel bookings (e.g., websites that offer travel bookings), such sources of travel bookings may influence the training of the learning machine 120 (e.g., determining or otherwise fully or partially affecting weightings applied to the decision trees).

Operation 422 may be suitable where the reference plans are reference travel plans, and the reference metadata of the reference travel plans indicates sizes of destination airports. Each of the indicated sizes may respectively correspond to a different reference travel plan among the reference travel plans. In operation 422, the training of the learning machine 120 to distinguish candidate first-type travel plans from candidate second-type travel plans is based on the indicated sizes of the destination airports. Thus, the sizes of destination airports may influence the training of the learning machine 120 (e.g., determining or otherwise fully or partially affecting weightings applied to the decision trees).

Operation 423 may be suitable where the reference plans are reference travel plans, and the reference metadata of the reference travel plans indicates ratios of layovers to destination cities. Each of the indicated ratios may respectively correspond to a different reference travel plan among the reference travel plans. In operation 423, the training of the learning machine 120 to distinguish candidate first-type travel plans from candidate second-type travel plans is based on the indicated ratios of layovers to destination cities. Thus, the number of layovers per destination may influence the training of the learning machine 120 (e.g., determining or otherwise fully or partially affecting weightings applied to the decision trees).

Operation 424 may be suitable where the reference plans are reference travel plans, and the reference metadata of the reference travel plans indicates total counts of destination cities. Each of the indicated total counts may respectively correspond to a different reference travel plan among the reference travel plans. In operation 424, the training of the learning machine 120 to distinguish candidate first-type travel plans from candidate second-type travel plans is based on the indicated total counts of destination cities. Thus, the total counts of destination cities may influence the training of the learning machine 120 (e.g., determining or otherwise fully or partially affecting weightings applied to the decision trees).

Operation 425 may be suitable where the reference plans are reference travel plans, and the reference metadata of the reference travel plans includes indications of whether conventions occurred in destination cities that each respectively corresponds to a different reference travel plan among the reference travel plans. In operation 425, the training of the learning machine 120 to distinguish candidate first-type travel plans from candidate second-type travel plans is based on the indications of whether conventions occurred in the destination cities. Thus, the indications of whether conventions co-occurred in destination cities may influence the training of the learning machine 120 (e.g., determining or otherwise fully or partially affecting weightings applied to the decision trees).

Operation 426 may be suitable where the reference plans are reference travel plans, and the reference metadata of the reference travel plans indicates dates of travel. Each reference travel plan among the reference travel plans respectively corresponds to a different set of one or more dates of travel (e.g., a single date, or a pair or range of dates). In operation 426, the learning machine trainer module 220 accesses a curated database of annual first-type events whose dates of occurrence vary by year. The curated database may be stored in the database 115 and accessed therefrom. Furthermore, in operation 426, the training of the learning machine 120 to distinguish candidate first-type travel plans from candidate second-type travel plans is based on a comparison of the dates of occurrence to the dates of travel. Thus, such annual first-type events may influence the training of the learning machine 120 (e.g., determining or otherwise fully or partially affecting weightings applied to the decision trees).

Operation 427 may be suitable where the reference plans are reference travel plans, and the reference metadata of the reference travel plans indicates dates of travel. Each reference travel plan among the reference travel plans respectively corresponds to a different set of one or more dates of travel (e.g., a single date, or a pair or range of dates). In operation 427, the learning machine trainer module 220 accesses a curated database of annual second-type events whose dates of occurrence vary by year. The curated database may be stored in the database 115 and accessed therefrom. Furthermore, in operation 427, the training of the learning machine 120 to distinguish candidate first-type travel plans from candidate second-type travel plans is based on a comparison of the dates of occurrence to the dates of travel. Thus, such annual second-type events may influence the training of the learning machine 120 (e.g., determining or otherwise fully or partially affecting weightings applied to the decision trees).

As shown in FIG. 4, one or both of operations 430 and 431 may be performed as part of operation 330, in which the learning machine modifier module 230 modifies the trained learning machine 120 based on asymmetrical penalties discussed above.

In operation 430, the learning machine modifier module 230 applies a first penalty (e.g., in a pair of unequal and asymmetrical penalties) for incorrectly classifying a plan as a first-type plan. This first penalty is applied to the trained learning machine 120 (e.g., in the form of weighting one or more decision trees with a first mathematical weighting factor that penalizes erroneous classifications into the first type of plan).

In operation 431, the learning machine modifier module 230 applies a second penalty (e.g., in the pair of unequal and asymmetrical penalties) for incorrectly classifying a plan as a second-type plan. This second penalty is applied to the trained learning machine 120 (e.g., in the form of weighting one or more decision trees with a second mathematical weighting factor that penalizes erroneous classifications into the second type of plan).

With respect to operations 430 and 431, the first penalty is more significant (e.g., larger in absolute value) than the second penalty in some example embodiments. This may have the effect of biasing the modified learning machine 120 to be more aggressive in classifying plans into the second type, and more conservative in classifying plans into the first type. Conversely, in alternative example embodiments, the first penalty is less significant than the second penalty. This may have the effect of biasing the modified learning machine 120 toward being more conservative in classifying plans into the second type, and more aggressive in classifying plans into the first type.

According to various example embodiments, one or more of the methodologies described herein may facilitate training a learning machine. Moreover, one or more of the methodologies described herein may facilitate training a learning machine to distinguish first-type plans from second-type plans. Hence, one or more of the methodologies described herein may facilitate automatically distinguishing candidate first-type plans from candidate second-type plans based on asymmetrical penalties for incorrectly distinguishing candidate first-type plans from candidate second-type plans, as well as consistently making such distinction across numerous instances of candidate plans, compared to capabilities of pre-existing systems and methods.

When these effects are considered in aggregate, one or more of the methodologies described herein may obviate a need for certain efforts or resources that otherwise would be involved in classifying first-type plans and second-type plans. Efforts expended by a user in determining correct classifications of plans may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 5:
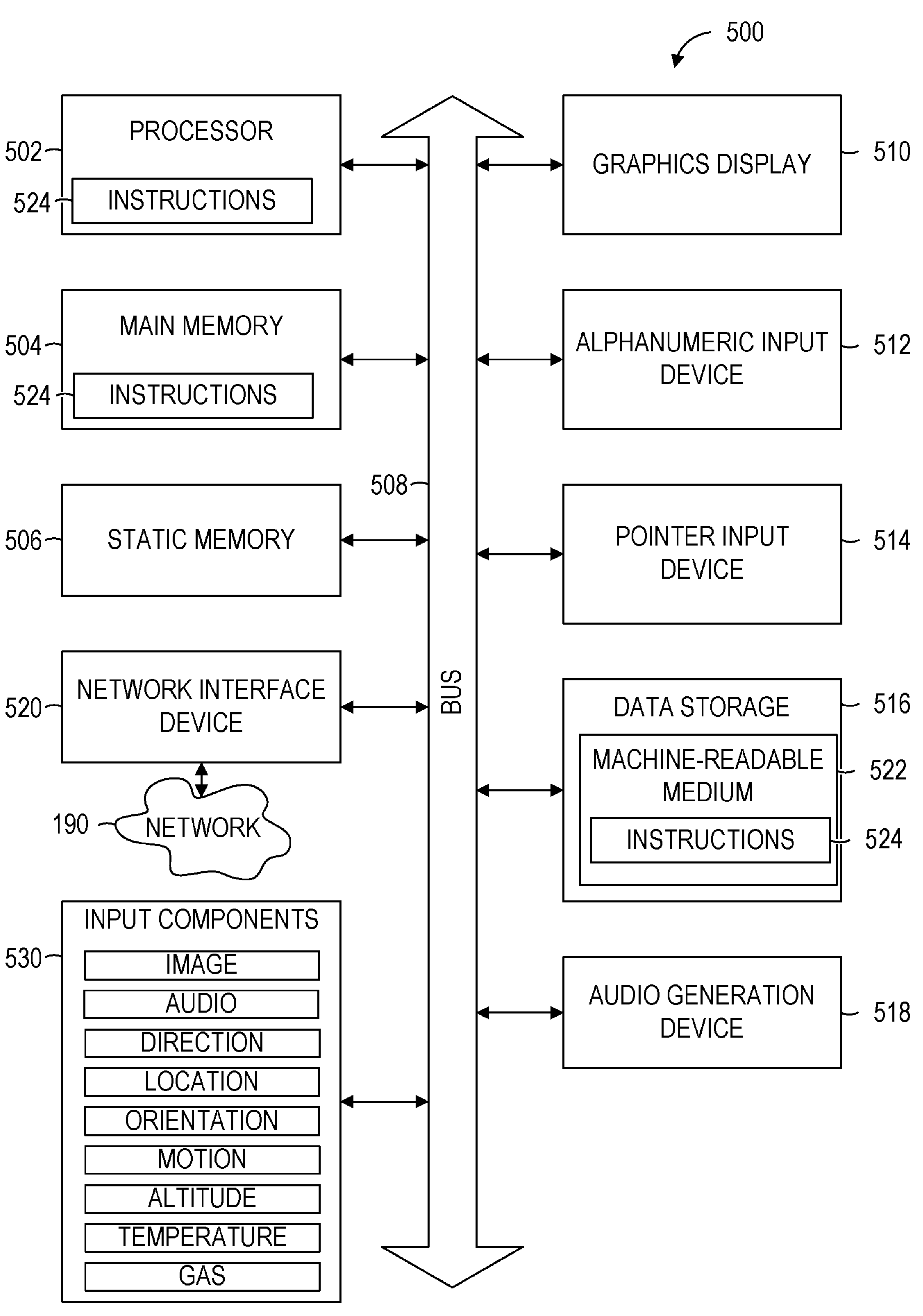
FIG. 5 is a block diagram illustrating components of a machine, according to some example embodiments, able to read instructions from a machine-readable medium and perform any one or more of the methodologies discussed herein.

FIG. 5 is a block diagram illustrating components of a machine 500, according to some example embodiments, able to read instructions 524 from a machine-readable medium 522 (e.g., a non-transitory machine-readable medium, a machine-readable storage medium, a computer-readable storage medium, or any suitable combination thereof) and perform any one or more of the methodologies discussed herein, in whole or in part. Specifically, FIG. 5 shows the machine 500 in the example form of a computer system (e.g., a computer) within which the instructions 524 (e.g., software, a program, an application, an applet, an app, or other executable code) for causing the machine 500 to perform any one or more of the methodologies discussed herein may be executed, in whole or in part.

In alternative embodiments, the machine 500 operates as a standalone device or may be communicatively coupled (e.g., networked) to other machines. In a networked deployment, the machine 500 may operate in the capacity of a server machine or a client machine in a server-client network environment, or as a peer machine in a distributed (e.g., peer-to-peer) network environment. The machine 500 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 524, sequentially or otherwise, that specify actions to be taken by that machine.

Further, while only a single machine is illustrated, the term "machine" shall also be taken to include any collection of machines that individually or jointly execute the instructions 524 to perform all or part of any one or more of the methodologies discussed herein.

The machine 500 includes a processor 502 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 504, and a static memory 506, which are configured to communicate with each other via a bus 508. The processor 502 contains solid-state digital microcircuits (e.g., electronic, optical, or both) that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein. In some example embodiments, the processor 502 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 500 with at least the processor 502, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 500 may further include a graphics display 510 (e.g., a plasma display panel (PDP), a light emitting diode (LED) display, a liquid crystal display (LCD), a projector, a cathode ray tube (CRT), or any other display capable of displaying graphics or video). The machine 500 may also include an alphanumeric input device 512 (e.g., a keyboard or keypad), a pointer input device 514 (e.g., a mouse, a touchpad, a touchscreen, a trackball, a joystick, a stylus, a motion sensor, an eye tracking device, a data glove, or other pointing instrument), a data storage 516, an audio generation device 518 (e.g., a sound card, an amplifier, a speaker, a headphone jack, or any suitable combination thereof), and a network interface device 520.

The data storage 516 (e.g., a data storage device) includes the machine-readable medium 522 (e.g., a tangible and non-transitory machine-readable storage medium) on which are stored the instructions 524 embodying any one or more of the methodologies or functions described herein. The instructions 524 may also reside, completely or at least partially, within the main memory 504, within the static memory 506, within the processor 502 (e.g., within the processor's cache memory), or any suitable combination thereof, before or during execution thereof by the machine 500. Accordingly, the main memory 504, the static memory 506, and the processor 502 may be considered machine-readable media (e.g., tangible and non-transitory machine-readable media). The instructions 524 may be transmitted or received over the network 190 via the network interface device 520. For example, the network interface device 520 may communicate the instructions 524 using any one or more transfer protocols (e.g., hypertext transfer protocol (HTTP)).

In some example embodiments, the machine 500 may be a portable computing device (e.g., a smart phone, a tablet computer, or a wearable device) and may have one or more additional input components 530 (e.g., sensors or gauges). Examples of such input components 530 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 530 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 524 for execution by the machine 500, such that the instructions 524, when executed by one or more processors of the machine 500 (e.g., processor 502), cause the machine 500 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 524 for execution by the machine 500 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 524).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase “hardware module” should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase “hardware-implemented module” refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, “processor-implemented module” refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a “cloud computing” environment or as a service (e.g., within a “software as a service” (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an “algorithm” is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein.

A first example provides a method comprising:

accessing, by one or more processors, a training database of reference metadata descriptive of reference travel plans that include reference first-type travel plans (e.g., personal, non-tracked, non-reimbursable, or non-business travel plans) and reference second-type travel plans (e.g., non-personal, tracked, reimbursable, or business travel plans);

training, by the one or more processors, a learning machine to distinguish candidate first-type travel plans from candidate second-type travel plans, the learning machine being trained based on decision trees generated from randomly selected subsets of the reference metadata that is descriptive of the reference travel plans, the randomly selected subsets each describing a corresponding randomly selected portion of the reference travel plans that include the reference first-type travel plans and the reference second-type travel plans;

modifying, by the one or more processors, the trained learning machine based on asymmetrical penalties for incorrectly distinguishing candidate first-type travel plans from candidate second-type travel plans; and providing, by the one or more processors, the modified learning machine trained to distinguish candidate first-type travel plans from candidate second-type travel plans based on the asymmetrical penalties for incorrectly distinguishing candidate first-type travel plans from candidate second-type travel plans. According to such a method, the trainer machine 110 may train, modify, and provide the learning machine 120 (e.g., for run-time access by the devices 130 and 150).

A second example provides a method according to the first example, wherein:

the asymmetrical penalties include unequal first and second penalties, the first penalty to be applied for incorrectly classifying a candidate first-type travel plan being greater than the second penalty to be applied for incorrectly classifying a candidate second-type travel plan. Thus, misclassifying a travel plan as a first-type travel plan would incur a larger penalty than misclassifying it as a second-type travel plan.

A third example provides a method according to the first example, wherein:

the asymmetrical penalties include unequal first and second penalties, the first penalty to be applied for incorrectly classifying a candidate first-type travel plan being less than the second penalty to be applied for incorrectly classifying a candidate second-type travel plan. Thus, misclassifying a travel plan as a second-type travel plan would incur a larger penalty than misclassifying it as a first-type travel plan.

A fourth example provides a method according to any one of the first to third examples, wherein:

the reference metadata of the reference travel plans indicates source entities that each reserved a corresponding reference travel plan among the reference travel plans for a corresponding user; and the training of the learning machine to distinguish candidate first-type travel plans from candidate second-type travel plans is based on the indicated source entities that each reserved a corresponding reference travel plan for a corresponding user. Thus, where the source entities are or include sources of travel bookings (e.g., websites that offer travel bookings), such sources of travel bookings may influence the training of the learning machine (e.g., determining or otherwise fully or partially affecting weightings applied to the decision trees). For example, a first source (e.g., a first travel website) may be more influential than a second source (e.g., a second travel website).

A fifth example provides a method according to any one of the first through fourth examples, wherein:

the reference metadata of the reference travel plans indicates sizes of destination airports, the indicated sizes respectively corresponding to each reference travel plan among the reference travel plans; and the training of the learning machine to distinguish candidate first-type travel plans from candidate second-type travel plans is based on the indicated sizes of the destination airports. Thus, the sizes of destination airports may influence the training of the learning machine (e.g., determining or otherwise fully or partially affecting weightings applied to the decision trees). For example, large airport sizes (e.g., above a threshold percentile in size, runways, runway length, flights per day, or gates) may be correlated with first-type travel plans, while small airport sizes (e.g., below the threshold percentile in size, runways, runway length, flights per day, or gates) may be correlated with second-type travel plans, or vice versa.

A sixth example provides a method according to any of the first through fifth examples, wherein:

the reference metadata of the reference travel plans indicates ratios of layovers to destination cities, the indicated ratios respectively corresponding to each reference travel plan among the reference travel plans; and the training of the learning machine to distinguish candidate first-type travel plans from candidate second-type travel plans is based on the indicated ratios of layovers to destination cities. Thus, the number of layovers per destination may influence the training of the learning machine (e.g., determining or otherwise fully or partially affecting weightings applied to the decision trees). For example, a small number of layovers per destination (e.g., 0 or 1) may be correlated with second-type travel plans, while a large number of layovers per destination (e.g., 2+) may be correlated with first-type travel plans, or vice versa.

A seventh example provides a method according to any of the first through sixth examples, wherein:

the reference metadata of the reference travel plans indicates total counts of destination cities, the indicated total counts respectively corresponding to each reference travel plan among the reference travel plans; and the training of the learning machine to distinguish candidate first-type travel plans from candidate second-type travel plans is based on the indicated total counts of destination cities. Thus, the total counts of destination cities may influence the training of the learning machine (e.g., determining or otherwise fully or partially affecting weightings applied to the decision trees). For example, large total counts of destination cities may be correlated with first-type travel plans, while small total counts of destination cities may be correlated with second-type travel plans, or vice versa.

An eighth example provides a method according to any of the first through seventh examples, wherein:

the reference metadata of the reference travel plans includes indications of whether conventions occurred in destination cities respectively corresponding to each reference travel plan among the reference travel plans; and the training of the learning machine to distinguish candidate first-type travel plans from candidate second-type travel plans is based on the indications of whether conventions occurred in the destination cities. Thus, the indications of whether conventions co-occurred in destination cities may influence the training of the learning machine (e.g., determining or otherwise fully or partially affecting weightings applied to the decision trees). For example, occurrence of conventions may be correlated with second-type travel plans, while non-occurrence of conventions may be correlated with first-type travel plans. As another example, occurrence of first-type conventions may be correlated with first-type travel plans, while occurrence of second-type conventions may be correlated with second-type travel plans.

A ninth example provides a method according to any of the first through eighth examples, wherein:

accessing a curated database of annual first-type events whose dates of occurrence vary by year; and wherein:

the reference metadata of the reference travel plans indicates dates of travel respectively corresponding to each reference travel plan among the reference travel plans; and the training of the learning machine to distinguish candidate first-type travel plans from candidate second-type travel plans is based on a comparison of the dates of occurrence to the dates of travel. Thus, such annual first-type events may influence the training of the learning machine (e.g., determining or otherwise fully or partially affecting weightings applied to the decision trees). For example, travel plans during the Thanksgiving holidays or during Lunar New Year periods may be more likely to be first-type travel plans, while travel plans outside any of the annual first-type events tracked in the curated database may be more likely to be second-type travel plans.

A tenth example provides a method according to any of the first through ninth examples, wherein:

accessing a curated database of annual second-type events whose dates of occurrence vary by year; and wherein:

the reference metadata of the reference travel plans indicates dates of travel respectively corresponding to each reference travel plan among the reference travel plans; and the training of the learning machine to distinguish candidate first-type travel plans from candidate second-type travel plans is based on a comparison of the dates of occurrence to the dates of travel. Thus, such annual second-type events may influence the training of the learning machine (e.g., determining or otherwise fully or partially affecting weightings applied to the decision trees). For example, travel plans during a yearly trade show (e.g., Consumer Electronics Show (CES)) may be more likely to be second-type travel plans, while travel plans outside any of the annual second-type events tracked in the curated database may be more likely to be first-type travel plans.

An eleventh example provides a system (e.g., a computer system for training a learning machine) comprising:

one or more processors; and a memory storing instructions that, when executed by at least one processor among the one or more processors, cause the system to perform operations comprising:

accessing a training database of reference metadata descriptive of reference travel plans that include reference first-type travel plans and reference second-type travel plans;

training a learning machine to distinguish candidate first-type travel plans from candidate second-type travel plans, the learning machine being trained based on decision trees generated from randomly selected subsets of the reference metadata that is descriptive of the reference travel plans, the randomly selected subsets each describing a corresponding randomly selected portion of the reference travel plans that include the reference first-type travel plans and the reference second-type travel plans;

modifying the trained learning machine based on asymmetrical penalties for incorrectly distinguishing candidate first-type travel plans from candidate second-type travel plans; and providing the modified learning machine trained to distinguish candidate first-type travel plans from candidate second-type travel plans based on the asymmetrical penalties for incorrectly distinguishing candidate first-type travel plans from candidate second-type travel plans.

A twelfth example provides a system according to the eleventh example, wherein:

the asymmetrical penalties include unequal first and second penalties, the first penalty to be applied for incorrectly classifying a candidate first-type travel plan being greater than the second penalty to be applied for incorrectly classifying a candidate second-type travel plan.

A thirteenth example provides a system according to the eleventh example or the twelfth example, wherein:

the reference metadata of the reference travel plans indicates source entities that each reserved a corresponding reference travel plan among the reference travel plans for a corresponding user; and the training of the learning machine to distinguish candidate first-type travel plans from candidate second-type travel plans is based on the indicated source entities that each reserved a corresponding reference travel plan for a corresponding user.

A fourteenth example provides a system according to any of the eleventh to thirteenth examples, wherein:

the reference metadata of the reference travel plans indicates ratios of layovers to destination cities, the indicated ratios respectively corresponding to each reference travel plan among the reference travel plans; and the training of the learning machine to distinguish candidate first-type travel plans from candidate second-type travel plans is based on the indicated ratios of layovers to destination cities.

A fifteenth example provides a system according to any of the eleventh through fourteenth examples, wherein:

the reference metadata of the reference travel plans includes indications of whether conventions occurred in destination cities respectively corresponding to each reference travel plan among the reference travel plans; and the training of the learning machine to distinguish candidate first-type travel plans from candidate second-type travel plans is based on the indications of whether conventions occurred in the destination cities.

A sixteenth example provides a machine-readable medium (e.g., a non-transitory machine-readable storage medium) comprising instructions that, when executed by one or more processors of a machine, cause the machine to perform operations comprising:

accessing a training database of reference metadata descriptive of reference travel plans that include reference first-type travel plans and reference second-type travel plans;

training a learning machine to distinguish candidate first-type travel plans from candidate second-type travel plans, the learning machine being trained based on decision trees generated from randomly selected subsets of the reference metadata that is descriptive of the reference travel plans, the randomly selected subsets each describing a corresponding randomly selected portion of the reference travel plans that include the reference first-type travel plans and the reference second-type travel plans;

modifying the trained learning machine based on asymmetrical penalties for incorrectly distinguishing candidate first-type travel plans from candidate second-type travel plans; and providing the modified trained learning machine trained to distinguish candidate first-type travel plans from candidate second-type travel plans based on the asymmetrical penalties for incorrectly distinguishing candidate first-type travel plans from candidate second-type travel plans.

A seventeenth example provides a machine-readable medium according to the sixteenth example, wherein:

the asymmetrical penalties include unequal first and second penalties, the first penalty to be applied for incorrectly classifying a candidate first-type travel plan being greater than the second penalty to be applied for incorrectly classifying a candidate second-type travel plan.

An eighteenth example provides a machine-readable medium according to the sixteenth example or the seventeenth example, wherein:

the reference metadata of the reference travel plans indicates sizes of destination airports, the indicated sizes respectively corresponding to each reference travel plan among the reference travel plans; and the training of the learning machine to distinguish candidate first-type travel plans from candidate second-type travel plans is based on the indicated sizes of the destination airports.

A nineteenth example provides a machine-readable medium according to any of the sixteenth through eighteenth examples, wherein:

the reference metadata of the reference travel plans indicates total counts of destination cities, the indicated total counts respectively corresponding to each reference travel plan among the reference travel plans; and the training of the learning machine to distinguish candidate first-type travel plans from candidate second-type travel plans is based on the indicated total counts of destination cities.

A twentieth example provides a machine-readable medium according to any of the sixteenth to nineteenth examples, wherein the operations further comprise:

accessing a curated database of annual second-type events whose dates of occurrence vary by year; and wherein:

the reference metadata of the reference travel plans indicates dates of travel respectively corresponding to each reference travel plan among the reference travel plans; and the training of the learning machine to distinguish candidate first-type travel plans from candidate second-type travel plans is based on a comparison of the dates of occurrence to the dates of travel.

A twenty-first example provides a method comprising:

accessing, by one or more processors, a candidate travel plan to be classified by a learning machine trained to distinguish candidate first-type travel plans (e.g., personal, non-tracked, non-reimbursable, or non-business travel plans) from candidate second-type travel plans (e.g., non-personal, tracked, reimbursable, or business travel plans);

accessing, by the one or more processors, the learning machine trained to distinguish candidate first-type travel plans from candidate second-type travel plans, the learning machine being trained based on decision trees generated from randomly selected subsets of reference metadata that is descriptive of reference travel plans that include reference first-type travel plans and reference second-type travel plans, the randomly selected subsets each describing a corresponding randomly selected portion of the reference travel plans, the trained learning machine being modified based on asymmetrical penalties for incorrectly distinguishing candidate first-type travel plans from candidate second-type travel plans;

inputting, by the one or more processors, candidate metadata of the candidate travel plan to the learning machine trained to distinguish candidate first-type travel plans from candidate second-type travel plans and modified based on the asymmetrical penalties for incorrectly distinguishing candidate first-type travel plans from candidate second-type travel plans; and causing, by the one or more processors, presentation of a classification that indicates a type of the candidate travel plan, the indicated type being output from the learning machine in response to the inputting of the candidate metadata of the candidate travel plan. According to such a method, a device (e.g., device 130) may access and use the trained and modified learning machine 120 to classify a candidate travel plan and provide an indication of its type.

A twenty-second example provides a method according to the twenty-first example, wherein:

the candidate metadata of the candidate travel plan indicates a source entity that reserved the candidate travel plan for a corresponding user; and the learning machine outputs the type of the candidate travel plan based on the source entity that reserved the candidate travel plan for the corresponding user.

A twenty-third example provides a method according to the twenty-first or twenty-second example, wherein:

the candidate metadata of the candidate travel plan indicates a size of a destination airport corresponding to the candidate travel plan; and the learning machine outputs the type of the candidate travel plan based on the size of the destination airport corresponding to the candidate travel plan.

A twenty-fourth example provides a method according to any of the twenty-first through twenty-third examples, wherein:

the candidate metadata of the candidate travel plan indicates a ratio of layovers to destination cities corresponding to the candidate travel plan; and the learning machine outputs the type of the candidate travel plan based on the ratio of layovers to destination cities corresponding to the candidate travel plan.

A twenty-fifth example provides a method according to any of the twenty-first through twenty-fourth examples, wherein:

the candidate metadata of the candidate travel plan indicates a total count of destination cities corresponding to the candidate travel plan; and the learning machine outputs the type of the candidate travel plan based on the total count of destination cities corresponding to the candidate travel plan.

A twenty-sixth example provides a method according to any of the twenty-first through twenty-fifth examples, wherein:

the candidate metadata of the candidate travel plan includes an indication of whether a convention occurred in a destination city corresponding to the candidate travel plan; and the learning machine outputs the type of the candidate travel plan based on the indication of whether the convention occurred in the destination city corresponding to the candidate travel plan.

A twenty-seventh example provides a method according to any of the twenty-first through twenty-sixth examples, wherein:

the candidate metadata of the candidate travel plan indicates one or more dates of travel corresponding to the candidate travel plan; and the learning machine outputs the type of the candidate travel plan based on the one or more dates of travel corresponding to the candidate travel plan.

A twenty-eighth example provides a system (e.g., a computer system for training a learning machine) comprising:

one or more processors; and a memory storing instructions that, when executed by at least one processor among the one or more processors, cause the system to perform operations comprising:

accessing a candidate travel plan to be classified by a learning machine trained to distinguish candidate first-type travel plans from candidate second-type travel plans;

accessing the learning machine trained to distinguish candidate first-type travel plans from candidate second-type travel plans, the learning machine being trained based on decision trees generated from randomly selected subsets of reference metadata that is descriptive of reference travel plans that include reference first-type travel plans and reference second-type travel plans, the randomly selected subsets each describing a corresponding randomly selected portion of the reference travel plans, the trained learning machine being modified based on asymmetrical penalties for incorrectly distinguishing candidate first-type travel plans from candidate second-type travel plans;

inputting candidate metadata of the candidate travel plan to the learning machine trained to distinguish candidate first-type travel plans from candidate second-type travel plans and modified based on the asymmetrical penalties for incorrectly distinguishing candidate first-type travel plans from candidate second-type travel plans; and causing presentation of a classification that indicates a type of the candidate travel plan, the indicated type being output from the learning machine in response to the inputting of the candidate metadata of the candidate travel plan.

A twenty-ninth example provides a machine-readable medium (e.g., a non-transitory machine-readable storage medium) comprising instructions that, when executed by one or more processors of a machine, cause the machine to perform operations comprising:

accessing a candidate travel plan to be classified by a learning machine trained to distinguish candidate first-type travel plans from candidate second-type travel plans;

accessing the learning machine trained to distinguish candidate first-type travel plans from candidate second-type travel plans, the learning machine being trained based on decision trees generated from randomly selected subsets of reference metadata that is descriptive of reference travel plans that include reference first-type travel plans and reference second-type travel plans, the randomly selected subsets each describing a corresponding randomly selected portion of the reference travel plans, the trained learning machine being modified based on asymmetrical penalties for incorrectly distinguishing candidate first-type travel plans from candidate second-type travel plans;

inputting candidate metadata of the candidate travel plan to the learning machine trained to distinguish candidate first-type travel plans from candidate second-type travel plans and modified based on the asymmetrical penalties for incorrectly distinguishing candidate first-type travel plans from candidate second-type travel plans; and causing presentation of a classification that indicates a type of the candidate travel plan, the indicated type being output from the learning machine in response to the inputting of the candidate metadata of the candidate travel plan.

A thirtieth example provides a carrier medium carrying machine-readable instructions for controlling a machine to carry out the operations (e.g., method operations) performed in any one of the previously described examples.

What is claimed is:

1. A computer-implemented method comprising:

accessing, by one or more processors, a training database of reference metadata descriptive of reference travel plans that include reference first-type travel plans and reference second-type travel plans, the reference metadata indicating sizes of destination airports, the indicated sizes respectively corresponding to each reference travel plan among the reference travel plans;

training, by the one or more processors, a learning machine to distinguish candidate first-type travel plans from candidate second-type travel plans, the learning machine being trained based on the indicated sizes of the destination airports and subsets of the reference metadata that is descriptive of the reference travel plans, the subsets each describing a corresponding portion of the reference travel plans that include the reference first-type travel plans and the reference second-type travel plans; and modifying, by the one or more processors, the trained learning machine based on asymmetrical penalties for incorrectly distinguishing candidate first-type travel plans from candidate second-type travel plans, the asymmetrical penalties including unequal first and second penalties, the first penalty penalizing incorrectly classifying a candidate first-type travel plan being greater than the second penalty penalizing incorrectly classifying a candidate second-type travel plan.

2. The computer-implemented method of claim 1, further comprising:

providing, by the one or more processors, the modified learning machine trained to distinguish candidate first-type travel plans from candidate second-type travel plans based on the asymmetrical penalties for incorrectly distinguishing candidate first-type travel plans from candidate second-type travel plans.

3. The computer-implemented method of claim 1, wherein the candidate first-type travel plans comprise non-reimbursable non-business travel plans, and the candidate second-type travel plans comprise reimbursable business travel plans.

4. The computer-implemented method of claim 1, wherein the learning machine is trained based on decision trees generated from randomly selected subsets of the reference metadata.

5. The computer-implemented method of claim 1, wherein:

the reference metadata of the reference travel plans indicates source entities that each reserved a corresponding reference travel plan among the reference travel plans for a corresponding user; and the training of the learning machine to distinguish candidate first-type travel plans from candidate second-type travel plans is based on the indicated source entities that each reserved a corresponding reference travel plan for a corresponding user.

6. The computer-implemented method of claim 1, wherein:

the reference metadata of the reference travel plans indicates ratios of layovers to destination cities, the indicated ratios respectively corresponding to each reference travel plan among the reference travel plans; and the training of the learning machine to distinguish candidate first-type travel plans from candidate second-type travel plans is based on the indicated ratios of layovers to destination cities.

7. The computer-implemented method of claim 1, wherein:

the reference metadata of the reference travel plans indicates total counts of destination cities, the indicated total counts respectively corresponding to each reference travel plan among the reference travel plans; and the training of the learning machine to distinguish candidate first-type travel plans from candidate second-type travel plans is based on the indicated total counts of destination cities.

8. The computer-implemented method of claim 1, wherein:

the reference metadata of the reference travel plans includes indications of whether conventions occurred in destination cities respectively corresponding to each reference travel plan among the reference travel plans; and the training of the learning machine to distinguish candidate first-type travel plans from candidate second-type travel plans is based on the indications of whether conventions occurred in the destination cities.

9. A system comprising:

one or more processors; and a memory storing instructions that, when executed by at least one processor among the one or more processors, cause the system to perform operations comprising:

accessing a training database of reference metadata descriptive of reference travel plans that include reference first-type travel plans and reference second-type travel plans, the reference metadata indicating sizes of destination airports, the indicated sizes respectively corresponding to each reference travel plan among the reference travel plans;

training a learning machine to distinguish candidate first-type travel plans from candidate second-type travel plans, the learning machine being trained based on the indicated sizes of the destination airports and subsets of the reference metadata that is descriptive of the reference travel plans, the subsets each describing a corresponding portion of the reference travel plans that include the reference first-type travel plans and the reference second-type travel plans; and modifying the trained learning machine based on asymmetrical penalties for incorrectly distinguishing candidate first-type travel plans from candidate second-type travel plans, the asymmetrical penalties including unequal first and second penalties, the first penalty penalizing incorrectly classifying a candidate first-type travel plan being greater than the second penalty penalizing incorrectly classifying a candidate second-type travel plan.

10. The system of claim 9, wherein the operations further comprise:

providing the modified learning machine trained to distinguish candidate first-type travel plans from candidate second-type travel plans based on the asymmetrical penalties for incorrectly distinguishing candidate first-type travel plans from candidate second-type travel plans.

11. The system of claim 9, wherein the candidate first-type travel plans comprise non-reimbursable non-business travel plans, and the candidate second-type travel plans comprise reimbursable business travel plans.

12. The system of claim 9, wherein the learning machine is trained based on decision trees generated from randomly selected subsets of the reference metadata.

13. The system of claim 9, wherein:

the reference metadata of the reference travel plans indicates source entities that each reserved a corresponding reference travel plan among the reference travel plans for a corresponding user; and the training of the learning machine to distinguish candidate first-type travel plans from candidate second-type travel plans is based on the indicated source entities that each reserved a corresponding reference travel plan for a corresponding user.

14. The system of claim 9, wherein:

the reference metadata of the reference travel plans indicates ratios of layovers to destination cities, the indicated ratios respectively corresponding to each reference travel plan among the reference travel plans; and the training of the learning machine to distinguish candidate first-type travel plans from candidate second-type travel plans is based on the indicated ratios of layovers to destination cities.

15. The system of claim 9, wherein:

the reference metadata of the reference travel plans indicates total counts of destination cities, the indicated total counts respectively corresponding to each reference travel plan among the reference travel plans; and the training of the learning machine to distinguish candidate first-type travel plans from candidate second-type travel plans is based on the indicated total counts of destination cities.

16. The system of claim 9, wherein:

the reference metadata of the reference travel plans includes indications of whether conventions occurred in destination cities respectively corresponding to each reference travel plan among the reference travel plans; and the training of the learning machine to distinguish candidate first-type travel plans from candidate second-type travel plans is based on the indications of whether conventions occurred in the destination cities.

17. A non-transitory machine-readable storage medium comprising instructions that, when executed by one or more processors of a machine, cause the machine to perform operations comprising:

accessing a training database of reference metadata descriptive of reference travel plans that include reference first-type travel plans and reference second-type travel plans, the reference metadata indicating sizes of destination airports, the indicated sizes respectively corresponding to each reference travel plan among the reference travel plans;

training a learning machine to distinguish candidate first-type travel plans from candidate second-type travel plans, the learning machine being trained based on the indicated sizes of the destination airports and subsets of the reference metadata that is descriptive of the reference travel plans, the subsets each describing a corresponding portion of the reference travel plans that include the reference first-type travel plans and the reference second-type travel plans; and modifying the trained learning machine based on asymmetrical penalties for incorrectly distinguishing candidate first-type travel plans from candidate second-type travel plans, the asymmetrical penalties including unequal first and second penalties, the first penalty penalizing incorrectly classifying a candidate first-type travel plan being greater than the second penalty penalizing incorrectly classifying a candidate second-type travel plan.

18. The non-transitory machine-readable storage medium of claim 17, wherein the operations further comprise:

providing the modified learning machine trained to distinguish candidate first-type travel plans from candidate second-type travel plans based on the asymmetrical penalties for incorrectly distinguishing candidate first-type travel plans from candidate second-type travel plans.

* * * * *